US011236187B2

(12) United States Patent
Xie et al.

(10) Patent No.: US 11,236,187 B2
(45) Date of Patent: Feb. 1, 2022

(54) POROUS CYCLODEXTRIN POLYMER

(71) Applicant: NANJING UNIVERSITY, JiangSu (CN)

(72) Inventors: Xianchuan Xie, JiangSu (CN); Yizhou Tu, JiangSu (CN)

(73) Assignee: NANJING UNIVERSITY, JiangSu (CN)

( * ) Notice: Subject to any disclaimer, the term of this patent is extended or adjusted under 35 U.S.C. 154(b) by 0 days.

(21) Appl. No.: 16/939,780

(22) Filed: Jul. 27, 2020

(65) Prior Publication Data

US 2021/0147600 A1 May 20, 2021

(30) Foreign Application Priority Data

Oct. 11, 2019 (CN) .......................... 201910962587.7

(51) Int. Cl.
*C08F 251/00* (2006.01)
(52) U.S. Cl.
CPC .................................. *C08F 251/00* (2013.01)
(58) Field of Classification Search
CPC ..................................................... C08F 251/00
See application file for complete search history.

(56) References Cited

U.S. PATENT DOCUMENTS

| 10,982,014 | B2* | 4/2021 | Xie | ..................... | C08B 37/0012 |
| 2011/0124079 | A1* | 5/2011 | Lee | ........................ | C12N 11/06 |
| | | | | | 435/178 |

FOREIGN PATENT DOCUMENTS

WO 2011117317 A2 9/2011

OTHER PUBLICATIONS

Li et al., Hyper-cross-linked β-cyclodextrin porous polymer: an adsorption-facilitated molecular catalyst support for transformation of water-soluble aromatic molecules, Chemical Science 2016, 7, (2), pp. 905-909 (Year: 2016).*
"Microporous Organic Polymers for Methane Storage," Wood et al., Advanced Materials 2008, 20, (10), pp. 1916-1921.
"Metal-free and Scalable Synthesis of Porous Hyper-crosslinked Polymers: Towards Applications in Liquid-Phase Adsorption," Schute et al., ChemSusChem 2015, 8, (20), pp. 3419-3423.
"Hyper-crosslinked β-cyclodextrin porous polymer: an adsorption-facilitated molecular catalyst support for transformation of water-soluble aromatic molecules," Li et al., Chem Sci 2016, 7, (2), 905-909.
"Rapid removal of organic micropollutants from water by a porous β-cyclodextrin polymer," Alsbaiee et al., Nature 2016, 529, (7585), pp. 190-206.

* cited by examiner

*Primary Examiner* — Robert D Harlan
(74) *Attorney, Agent, or Firm* — Juan Carlos A. Marquez; Marquez IP Law Office, PLLC (57) ABSTRACT

The disclosure provides an amphiphilic porous cyclodextrin polymer: cyclodextrin is grafted with aromatic molecules, and then alkylated with biphenyl benzylidene chloride and p-xylylene dichloride through Friedel-Crafts reaction, to obtain a porous polymer with an ultrahigh specific surface area. This material has very high adsorption capacity and can be reused for simple regeneration. Because the hydroxy groups of cyclodextrin are partially retained, the hydrophilicity of the material surface is improved, allowing the adsorption rate to become faster. Moreover, there are a variety of adsorption mechanisms, and hydrophobic and hydrophilic pollutants can be adsorbed simultaneously.

11 Claims, 7 Drawing Sheets

POROUS CYCLODEXTRIN POLYMER

TECHNICAL FIELD

The disclosure pertains to the technical field of environment-friendly materials, and specifically pertains to a preparation method of an amphiphilic cyclodextrin polymer with a high specific surface area and the use thereof.

BACKGROUND

Cyclodextrin (CD) is prepared by the action of cyclodextrin glucosyl transferase on starch. Cyclodextrin materials have the advantages of low cost, good adsorption performance, and good regeneration performance. They are a new type of potential adsorbents. Their distinct hydrophobic cavities and hydrophilic outer linings can encapsulate organic pollutants through subject-object mechanism. Additionally, CD molecules are highly reactive, and there are a large amount of hydroxy groups at their both ends. Therefore, they can be crosslinked with different crosslinking agents to form macromolecular networks, which can also adsorb pollutants. However, the currently reported cyclodextrin polymers have very low specific surface areas (1-10 $m^2\ g^{-1}$) and less pore structures, which limit the application thereof in industry.

Friedel-Crafts alkylation reaction is often used for the preparation of hyper-cross-linked polymers, which have the characteristics of simple synthesis, porous, non-toxic, good thermal stability, etc. However, hyper-cross-linked polymers tend to be very hydrophobic and have very low densities, which are generally used for gas adsorption. The poor wettability also limits its application in water treatment. Therefore, it has become a new project to synthesize an amphiphilic hyper-cross-linked cyclodextrin material, specially an ideal material with high specific surface area, large adsorption capacity, rapid adsorption rate, good renewability and low cost.

Patent documentation 1 also discloses a cyclodextrin derivative. However, in patent documentation 1, cyclodextrin is completely substituted with benzyl, and then one to two benzyls are removed at particular positions of hydroxy for further modification. In the present invention, the charge rate of grafting reaction is directly controlled, the degree of substitution is low, the resulting intermediate has a large amount of benzyls to provide reactive sites for the next step, and a large amount of hydroxy groups are retained at the same time. After the last step of alkylation, the polymer obtained in the invention has a structure of $(BnO)x-(HO)y-CD-[C_{14}H_{12}]z-[C_8H_8]_r$, wherein x+y=21, z and r are both natural numbers. However, the structure of the polymer obtained in patent documentation 1 is $(BnO)m-CD-[CH_2-O-R_4-CN]n$, for example. The differences are in that in patent documentation 1, the reactive sites are hydroxy groups of cyclodextrin which form ether linkages, m+n is 21 (complete substitution), and the resulting substance is an intermediate; while in the present invention, hydroxy groups are retained, x<21 (low degree of substitution), the alkylation sites are on the aromatic ring of benzyl, and the final synthesized substance is high polymer, not an intermediate. On the basis of the differences, because the final substance contains a large amount of benzyl, hydroxy and benzene ring-containing crosslinking agents, so these rigid structures provide favorable conditions for pore-forming and provide a large amount of hydrophobic interactions during the process of polymerization; However, the large amount of hydroxy groups make the material hydrophilic, providing hydrogen-bond interactions in the adsorption of pollutants. The two interactions are combined so that the material has obvious advantages in adsorbing organic matter.

Existing Technical Documentations

Patent documentation 1: WO2011/117317

Non-Patent Documentations:

1. Wood, C. D.; Tan, B.; Trewin, A.; Su, F.; Rosseinsky, M. J.; Bradshaw, D.; Sun, Y.; Zhou, L.; Cooper, A. I., Microporous Organic Polymers for Methane Storage. Advanced Materials 2008, 20, (10), 1916-1921.
2. Schute, K.; Rose, M., Metal-free and Scalable Synthesis of Porous Hyper-cross-linked Polymers: Towards Applications in Liquid-Phase Adsorption. ChemSusChem 2015, 8, (20), 3419-23.
3. Li, H.; Meng, B.; Chai, S. H.; Liu, H.; Dai, S., Hyper-crosslinked beta-cyclodextrin porous polymer: an adsorption-facilitated molecular catalyst support for transformation of water-soluble aromatic molecules. Chem Sci 2016, 7, (2), 905-909.
4. Alsbaiee, A.; Smith, B. J.; Xiao, L.; Ling, Y.; Helbling, D. E.; Dichtel, W. R., Rapid removal of organic micropollutants from water by a porous beta-cyclodextrin polymer. Nature 2016, 529, (7585), 190-4.

SUMMARY

Technical Problems to be Solved in the Invention

On the basis of previous researches, the present invention proposes an idea of benzylation of cyclodextrin and crosslinking with an alkylating agent with a rigid structure to prepare a porous polymer with a high specific surface area. The benzylation proportion of cyclodextrin is adjusted so that most hydroxy groups on the cyclodextrin can be retained, and the hydrophilicity on the surface of the material is adjusted so that the prepared cyclodextrin polymer material shows very rapid adsorption performance on the organic pollutants in waters, with the removal efficiency within 1 minute greater than 95%; at the same time, the prepared cyclodextrin polymer material has a very high adsorption capacity, which is more than 2 times that of activated carbon, and more than 4 times that of EPI-CDP. In addition, as a result of multiple adsorption mechanisms at the same time, including hydrophobic interaction, cyclodextrin inclusion, and hydrogen-bond interaction, the polymer can adsorb hydrophobic pollutants and hydrophilic pollutants simultaneously.

The technical scheme of the invention is as below:

A cyclodextrin porous polymer with a high specific surface area is prepared as below: cyclodextrin is grafted with an aromatic compound, then crosslinked with an alkylating agent at a certain temperature with Lewis acid as the catalyst. At the end of the reaction, the materials are filtered, washed with water and methanol successively for many times, and dried to obtain a porous polymer with a high specific surface area.

The aromatic compound grafted with the above cyclodextrin polymer is a halogenated compound. This is because in the grafting reaction, hydrogen atoms on the hydroxy groups of cyclodextrin are preferably replaced with sodium hydride, and the halogenated aromatic compound is then added, the schematic of the reaction is shown as below.

The halogenated compound grafted with the above cyclodextrin polymer is preferably a benzylation reagent. The conditions for benzylation are mild, which can be conducted at room temperature and rapidly.

For the above cyclodextrin polymer, the benzylation reagent is any one or a combination of benzyl bromide and benzyl chloride.

For the above cyclodextrin polymer, there are 21 hydroxy groups in the cyclodextrin. To control the proportion of benzylation, the molar ratio of the benzylation reagent to cyclodextrin is in a range of 1-21:1, preferably 3-7:1, and more preferably 7:1. It is found through comparison of specific surface areas and contact angles after crosslinking at different degrees of benzylation that, cyclodextrin with low benzylation has a higher specific surface area after crosslinking and the surface of the materials changes from super-hydrophobic (contact angle of 118.3°) to hydrophilic (contact angle of 7.8°). This is due to that cyclodextrin with low benzylation has low steric hindrance during crosslinking reaction, more micropores can be generated, thus getting much larger specific surface area. At the same time, a large amount of hydroxy groups are retained, improving the hydrophilicity of the surface, and greatly increasing the wettability of the materials in liquid phase adsorption, promoting the adsorption diffusion process and thereby allowing the material to have an ultra-high adsorption rate.

For the above cyclodextrin polymer, the alkylating agent is any one or a combination of benzene ring-containing alkylating agents. The introduction of the benzene ring with a rigid structure allows the large amount of benzene rings in the polymer to generate strong hydrophobic interactions, which has an important effect on the adsorption and enrichment of organic substances.

For the above cyclodextrin polymer, the benzene ring-containing alkylating agent is selected from the group consisting of p-xylylene dichloride, biphenyl benzylidene chloride, p-xylylene dibromide, biphenyl benzylidene bromide, and the combination thereof. The combination of biphenyl benzylidene chloride and p-xylylene dichloride is preferable, the resulting specific surface area is 1273-1445 $m^2\ g^{-1}$, which is a higher specific surface area compared with that when using a single crosslinking agent (710-1061 $m^2\ g^{-1}$).

For the above cyclodextrin polymer, the molar ratio of the alkylating agent to benzylized cyclodextrin is 5-8:1.

For the above cyclodextrin polymer, the Lewis acid used is any one of metal chloride and sulfuric acid. The process of Friedel-Crafts alkylation reaction is as below: carbocations are firstly generated from the alkylating agent under the action of the catalyst Lewis acid, and then an electrophilic reaction occurs between the carbocations and the electron-rich aromatic rings to generate alkylated products.

For the above cyclodextrin polymer, the metal chloride used is any one of ferric trichloride and aluminium trichloride. Ferric trichloride is preferable due to its better water resistance than aluminium trichloride.

The cyclodextrin polymer with a high specific surface area of the invention can be used as the adsorbent to remove organic micropollutants in waters, and can also be used as the pretreatment material for the enrichment and extraction of low concentration of organic micropollutants in waters.

Further, the aromatic compounds have better effects on the enrichment and removal of organic micropollutants.

The present invention has the following beneficial effects: compared with the prior art, the material prepared with the preparation method of the invention has a specific surface area of up to 1445 $m^2\ g^{-1}$, the specific surface area of micropores reaches 523 $m^2\ g^{-1}$, and furthermore it has a good thermal stability, with a mass loss of only 5% at 275° C. Additionally, the hydrophilcity and hydrophobicity of the surface of the material can be changed by adjusting the proportion of benzylation for application in different situations. For example, when the proportion of benzylation is 7:1, hydroxy groups on the cyclodextrin are partially retained so as to improve the hydrophilicity of the material, which is conducive to the ultrahigh adsorption rate of the material during the liquid phase adsorption, with the removal efficiency within 1 minute greater than 95%. However, for higher proportion of benzylation, such as 14:1 and 21:1, as the prepared material is high hydrophobic on the surface, so it can be used for gas adsorption where moisture interference needs to be removed. Meanwhile, as the material is amphiphilic, there are a large amount of hydrophobic groups as well as a large amount of hydrophilic hydroxy groups in the material, various adsorption mechanisms work together so that the material can adsorb hydrophobic and hydrophilic pollutants simultaneously.

DESCRIPTION OF THE EMBODIMENTS

Specific characterization of the materials and Instruments:
Physicochemical adsorption instrument: ASAP 2020 (Micromeritics, USA), used for determining the nitrogen adsorption isotherm, specific surface area and pore size distribution of the materials.

Infrared measuring instrument: TENSOR 27 (BRUKER, Germany).

Elemental analyzer: Elementar vario EL cube (Elementar, Germany), used for determining the contents of C, H, N, O elements in the materials and researching the components of the polymer.

Thermal analyzer: Pyris 1 DSC (PerKinElmer, USA), used for researching the thermal stability of the materials by the thermogravimetric curve.

Scanning electron microscope: FEI QUANTA 250 FEG (FEI, USA). The surface of the sample is sprayed with gold before test to increase its conductivity.

Transmission electron microscope: JEM-2100F (JEOL, Japan).

Contact angle meter: DSA100 (Kruss, Germany).

Embodiment 1

Preparation of Porous Cyclodextrin Polymer:

Cyclodextrin is dissolved and cooled in an ice-water bath; sodium hydride is added and stirred evenly, into which is added dropwise the benzylation reagent slowly, and reacted overnight to obtain the benzylized cyclodextrin. The molar ratio of the benzylation reagent to cyclodextrin is shown in the summary table of the embodiments below. The benzylized cyclodextrin is then reacted with an alkylating agent in an oil bath pan equipped with a magnetic stirrer at a certain rotational speed and temperature for a period of time, under the catalysis of Lewis acid in an atmosphere of nitrogen. The molar ratio of the alkylating agent to the benzylized cyclodextrin is 5-8:1. The temperature is generally 55-100° C., and preferably 75-90° C. The reaction time is preferably 15-30 h, preferably 19-25 h, and most preferably 19 h. If it is not within the above preferred ranges, there will be incomplete reaction and low yield. The resulting products are washed with distilled water and methanol respectively for many times, extracted through Soxhlet extraction with methanol, and then dried in vacuum to obtain a new type of cyclodextrin materials.

Chemical reagents and materials: All the samples in the summary table of the embodiments are synthesized at the same conditions. Wherein, the cyclodextrin used is any one of α, β, γ-cyclodextrin; the benzylation reagent is any one of benzyl bromide and benzyl chloride; the alkylating agent is any one or a combination of biphenyl benzylidene chloride and p-xylylene dichloride; Lewis acid is metal chloride or sulfuric acid, and the metal chloride is any one of aluminium trichloride and ferric trichloride.

The ratio of the benzylation reagent to cyclodextrin will change the hydrophilcity and hydrophobicity on the surface of the material. To obtain different samples, on the basis of Embodiment 1, the ratio of the benzylation reagent to cyclodextrin is adjusted as shown in Table 1 and the obtained polymers are tested with the results shown in Table 1.

It is demonstrated from Table 1 that cyclodextrin with low benzylation has a higher specific surface area after cross-linking. This is due to that cyclodextrin with low benzylation has low steric hindrance during crosslinking reaction, greatly inhibiting the generation of mesopores, thus obtaining more micropores and much larger specific surface areas. Moreover, hydroxy groups are partially retained, improving the hydrophilicity and increasing the wettability of the surface of the material, promoting the adsorption diffusion process and thereby allowing the adsorption rate to become faster obviously, with the removal efficiency within 1 minute up to 95%. The molar ratio of the benzylation reagent to cyclodextrin is in a range of 1:1-21:1, preferably 3-7:1, and more preferably 7:1.

TABLE 1

| No. | Cyclodextrin | Benzylation Reagent | Benzylation Proportion [a] | Alkylating Agent | Catalyst | Specific Surface Area [b] | Adsorption Rate |
|---|---|---|---|---|---|---|---|
| 1 | β | BnBr | 7 | BCMBP + DCX | FeCl$_3$ | 1445 | Very Rapidly |
| 2 | β | BnBr | 3 | BCMBP + DCX | FeCl$_3$ | 1485 | Very Rapidly |
| 3 | β | BnBr | 14 | BCMBP + DCX | FeCl$_3$ | 979 | Less Rapidly |
| 4 | β | BnBr | 21 | BCMBP + DCX | FeCl$_3$ | 1273 | Less Rapidly |

As shown in Table 2, polymers obtained from different kinds of cyclodextrin are also analyzed. It is demonstrated from Table 2 that large specific surface areas and good adsorption performances can be achieved for α, β, γ-cyclodextrins after cross-linking.

TABLE 2

| No. | Cyclodextrin | Benzylation Reagent | Benzylation Proportion [a] | Alkylating Agent | Catalyst | Specific Surface Area [b] | Adsorption Rate |
|---|---|---|---|---|---|---|---|
| 1 | β | BnBr | 7 | BCMBP + DCX | FeCl$_3$ | 1445 | Very Rapidly |
| 5 | α | BnBr | 7 | BCMBP + DCX | FeCl$_3$ | 1426 | Very Rapidly |
| 6 | γ | BnBr | 7 | BCMBP + DCX | FeCl$_3$ | 1344 | Very Rapidly |

Table 3 is used for analyzing the effects of different catalysts, with the results shown in Table 3. It is demonstrated from Table 3 that both metal chlorides and sulfuric acid can be used as the catalysts for complete reactions. Aluminium trichloride is preferable because it is more prone to adsorb water. When sulfuric acid is used as the catalyst, the water resistance of the reaction can be increased, but the resulting specific surface area becomes lower. Both benzyl bromide and benzyl chloride can be used as the benzylation reagents to achieve great effects.

TABLE 3

| No. | Cyclodextrin | Benzylation Reagent | Benzylation Proportion [a] | Alkylating Agent | Catalyst | Specific Surface Area [b] | Adsorption Rate |
|---|---|---|---|---|---|---|---|
| 1 | β | BnBr | 7 | BCMBP + DCX | $FeCl_3$ | 1445 | Very Rapidly |
| 7 | β | BnBr | 7 | BCMBP + DCX | $AlCl_3$ | 1315 | Less Rapidly |
| 10 | β | BnCl | 7 | BCMBP + DCX | $FeCl_3$ | 1416 | Very Rapidly |
| 11 | β | BnBr | 7 | BCMBP + DCX | $H_2SO_4$ | 762 | Slowly |

It is demonstrated from Table 4 that polymers obtained by using different crosslinking agents have different specific surface areas and different adsorption effects. The combination of BCMBP and DCX has the best effect; BCMBP comes next, and the last is DCX.

TABLE 4

| No. | Cyclodextrin | Benzylation Reagent | Benzylation Proportion [a] | Alkylating Agent | Catalyst | Specific Surface Area [b] | Adsorption Rate |
|---|---|---|---|---|---|---|---|
| 4 | β | BnBr | 21 | BCMBP + DCX | $FeCl_3$ | 1273 | Less Rapidly |
| 8 | β | BnBr | 21 | BCMBP | $FeCl_3$ | 1061 | Less Rapidly |
| 9 | β | BnBr | 21 | DCX | $FeCl_3$ | 710 | Very Slowly |

The meanings and explanations of the symbols in the tables are as follows:
[a] the molar ratio of the benzylation reagent to cyclodextrin
[b] specific surface area unit: $m^2\ g^{-1}$
BnBr: benzyl bromide
BnCl: benzyl chloride
BCMBP: biphenyl benzylidene chloride
DCX: p-xylylene dichloride
$FeCl_3$: ferric trichloride
$AlCl_3$: aluminium trichloride
Very Rapidly: adsorption equilibrium achieved within 5 min;
Less Rapidly: adsorption equilibrium achieved within 10 min;
Slowly: adsorption equilibrium achieved within 20 min;
Very Slowly: adsorption equilibrium achieved within 30 min.

For better illustrating the synthesis method of the invention, No. 1 (PBCD-B-D) will be specifically explained below.

Preparation of Amphiphilic Cyclodextrin Polymer PBCD-B-D with a High Specific Surface Area:

Preparation of Cyclodextrin PBCD with Partial Benzylation

In a round-bottom flask, 2 g β-cyclodextrin is dissolved in 40 mL anhydrous dimethyl formamide, cooled to 0° C. in a low-temperature reaction bath, and then 0.59 g 60% sodium hydride is added and stirred for 15 min;

0.8 mL benzyl bromide is added dropwise into the solution slowly with a constant-pressure funnel, heated to room temperature and stirred overnight;

After reaction overnight, 5 mL methanol is added to quench the reaction;

100 mL distilled water is added, the mixture is extracted with dichloromethane continuously for three times, 50 mL for each time. The resulting solution is dried over anhydrous sodium sulfate and filtered, and concentrated by a rotary evaporator at 35° C. to obtain partial benzylized cyclodextrin PBCD.

Preparation of PBCD-B-D

1) In a thick-wall pressure flask, 1.06 g PBCD, 0.82 g biphenyl benzylidene chloride and 0.19 g p-xylylene dichloride are dissolved in 40 mL anhydrous 1,2-dichloroethane, into which is added 4.12 g anhydrous ferric trichloride slowly under the protection of nitrogen, heated to 80° C. and reacted for 19 h.

2) After the reaction, the brown precipitate is collected, washed with water and methanol until the filtrate becomes neutral and colorless, and extracted through Soxhlet extraction with methanol for 24 h, then dried at 50° C. in a vacuum oven for 24 h, and ground and sieved to obtain the brown powder PBCD-B-D.

Embodiment 2

Preparation of Cyclodextrin Polymer PBCD-B-D-H with High Specific Surface Area Through Sulfuric Acid Route a. Preparation of Cyclodextrin PBCD with Partial Benzylation In a round-bottom flask, 2 g β-cyclodextrin is dissolved in 40 mL anhydrous dimethyl formamide, cooled to 0° C. in a low-temperature reaction bath, and then 0.59 g 60% sodium hydride is added and stirred for 15 min;

0.8 mL benzyl bromide is added dropwise into the solution slowly with a constant-pressure funnel, heated to room temperature and stirred overnight;

After reaction overnight, 5 mL methanol is added to quench the reaction;

100 mL distilled water is added, the mixture is extracted with dichloromethane continuously for three times, 50 mL for each time. The resulting solution is dried over anhydrous sodium sulfate and filtered, and concentrated by a rotary evaporator at 35° C. to obtain partial benzylized cyclodextrin PBCD.

b. Preparation of PBCD-B-D-H

1) In a three-necked flask, 1.06 g PBCD, 0.82 g biphenyl benzylidene chloride and 0.19 g p-xylylene dichloride are dissolved in 20 mL anhydrous 1,2-dichloroethane, into which is added 5 mL 98% sulfuric acid slowly, then heated to 84° C. and reacted for 19 h, and refluxed at the same.

2) After the reaction, the brown precipitate is collected, washed with water and methanol until the filtrate becomes neutral and colorless, then dried at 50° C. in a vacuum oven for 24 h, and ground and sieved to obtain the brown powder PBCD-B-D-H.

Comparative Example 1: Preparation of Non-Porous β-Cyclodextrin Polymer EPI-CDP EPI-CDP is the most widely used cyclodextrin polymer, but it has the disadvantages of less pore structures and small adsorption capacity. In comparison, the present invention can achieve a specific surface area up to 1445 $m^2 g^{-1}$ and an ultrahigh adsorption rate simultaneously, with the removal efficiency within 1 minute greater than 95%.

EPI-CDP is prepared according to the method reported by Alsbaiee et, al.

(1) 3 g β-cyclodextrin is weighed into a round-bottom flask, into which is added 5 ml NaOH solution of 6.25 mol $L^{-1}$ to dissolve β-cyclodextrin completely. (2) The flask is placed into an oil bath pan of which the temperature is adjusted to 60° C. and the rotational speed is 120 rpm, 2.5 mL epichlorohydrin solution is added dropwise into the flask and then reacted for 1 h. (3) The white gel obtained from the reaction is collected and filtered into a beaker, washed with distilled water, tetrahydrofuran and dichloromethane successively for 3-4 times for purification. (4) The purified products are lyophilized in vacuum at 50° C. for 12-24 h. (5) The prepared non-porous β-cyclodextrin polymer EPI-CDP is ground into powders (60-80 meshes), ready for use.

Comparative Example 2: Granular Activated Carbon (GAC)

Granular activated carbon is the most widely used adsorbent in water treatment. It has a large amount of microporous structures, but its adsorption rate is slow, the equilibrium cannot be reached within 30 minutes and the energy consumption on regeneration is high. Granular activated carbon (DARCO-AC, 12-20 meshes) is purchased from Sigma Co., which is used after being ground into fine powders (60-80 meshes). In comparison, the present invention can achieve a specific surface area up to 1445 $m^2 g^{-1}$ and an ultrahigh adsorption rate simultaneously, with the removal efficiency within 1 minute greater than 95%.

Embodiment 3

To fully illustrate the material performances of the amphiphilic cyclodextrin polymer PBCD-B-D with a high specific surface area prepared in Embodiment 1, four model pollutants with different water solubilities (3-phenylphenol, 2-naphthol, p-nitrophenol, p-chlorophenol) are chosen for adsorption experiments, with activated carbon GAC and non-porous cyclodextrin polymer EPI-CDP as the comparative materials, the specific processes are as below:

The used adsorbents are all ground into powders (60-80 meshes) before use. The chosen samples are filtered over 0.22 μm Agilent PTFE-Q filter membrane (almost no adsorption for the above pollutants). The concentrations of different pollutants in water samples are then determined by high performance liquid chromatography (HPLC). Agilent XDB-C18 analytical column (5 μm, 4.6×250 mm) is used as the chromatographic column, and the detector is an ultraviolet detector.

The specific determination method of adsorption isotherm is as below: 10 mg adsorbents are poured into 40 mL pollutant solution formulated at a concentration range of 0.1-2.4 mmol $L^{-1}$. They are reacted at 20° C. and at a rotational speed of 150 rpm for 12 h. The adsorption capacity is calculated according to the following formula:

$$q_e = \frac{(C_0 - C_e)}{m} V$$

wherein $q_e$ (mmol $g^{-1}$) is the amount of adsorbed pollutants per gram, $C_0$ (mmol $L^{-1}$) and $C_e$ (mmol $L^{-1}$) are the initial concentration and the residual concentration of the pollutants, respectively. m (g) is the mass of the adsorbent, V (L) is the volume of the aqueous solution of pollutants.

The specific process of adsorption kinetic experiment is as below: 10 mg adsorbents are poured into 40 mL pollutant solution formulated at a concentration of 0.1 mmol $L^{-1}$. Under magnetic agitation, a small amount of water samples are taken with a syringe at regular intervals, and filtered over a filter membrane and then determined by HPLC. The removal efficiency of pollutants from the solution is calculated according to the following formula:

$$\text{The removal efficiency (\%)} = \frac{C_0 - C_e}{C_0} \times 100$$

In the formula: $C_0$ (mmol $l^{-1}$) and $C_e$ (mmol $l^{-1}$) are the initial concentration and the residual concentration of the pollutants in the solution, respectively.

Figure 6:
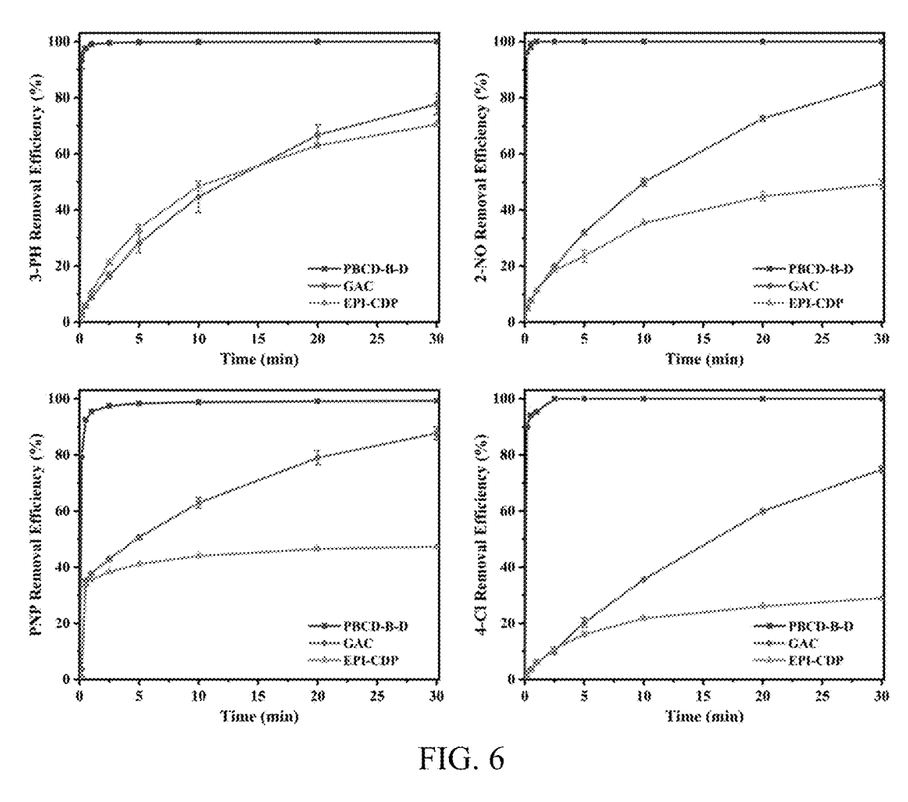
FIG. 6: The diagrams showing the adsorption kinetics of PBCD-B-D in Embodiment 1, comparative example 1, and comparative example 2 on the selected pollutants.
Figure 7A:
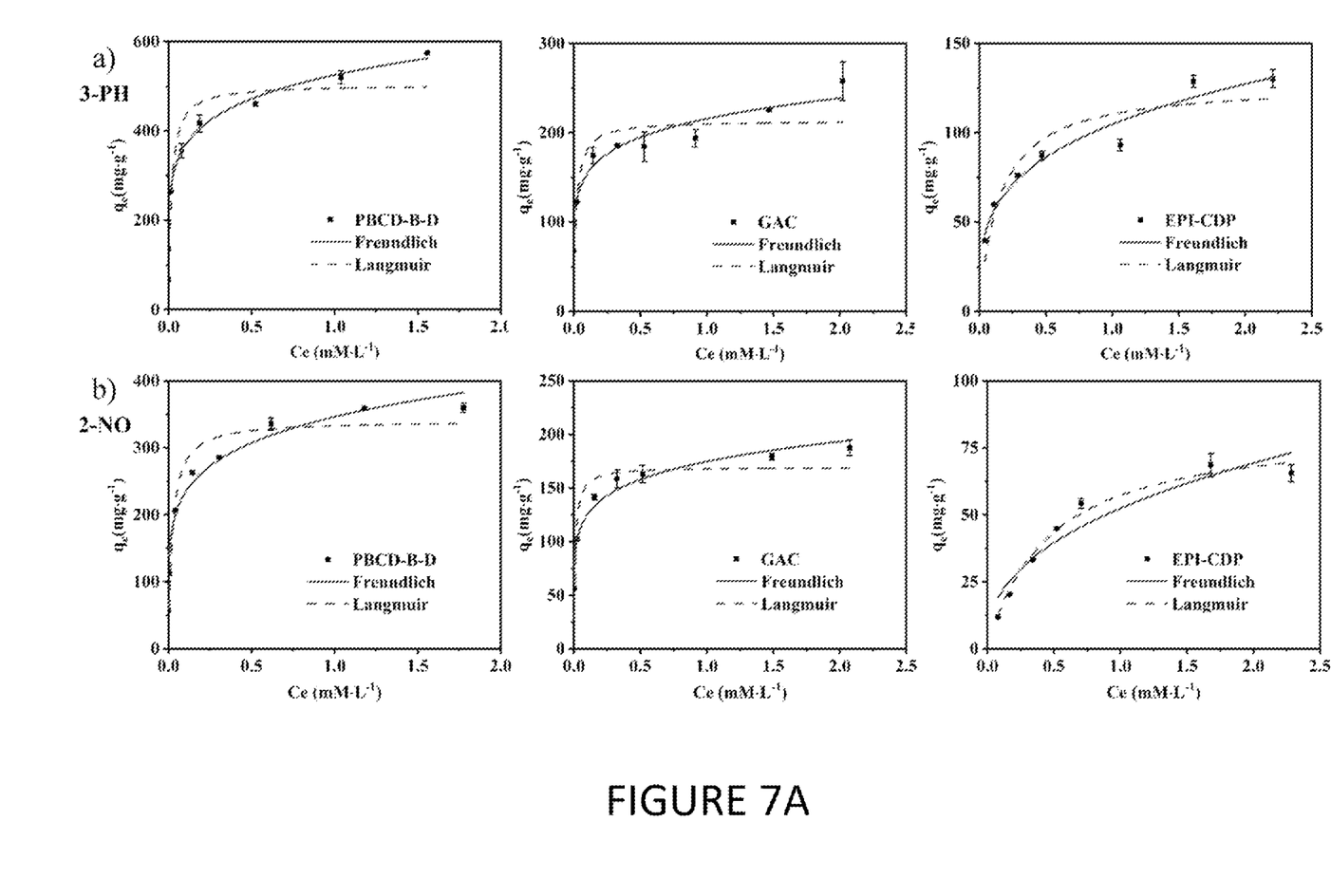
FIGS. 7A and 7B: The diagrams showing the adsorption isotherm of PBCD-B-D in Embodiment 1, comparative example 1, and comparative example 2 on the selected pollutants.
Figure 7B:
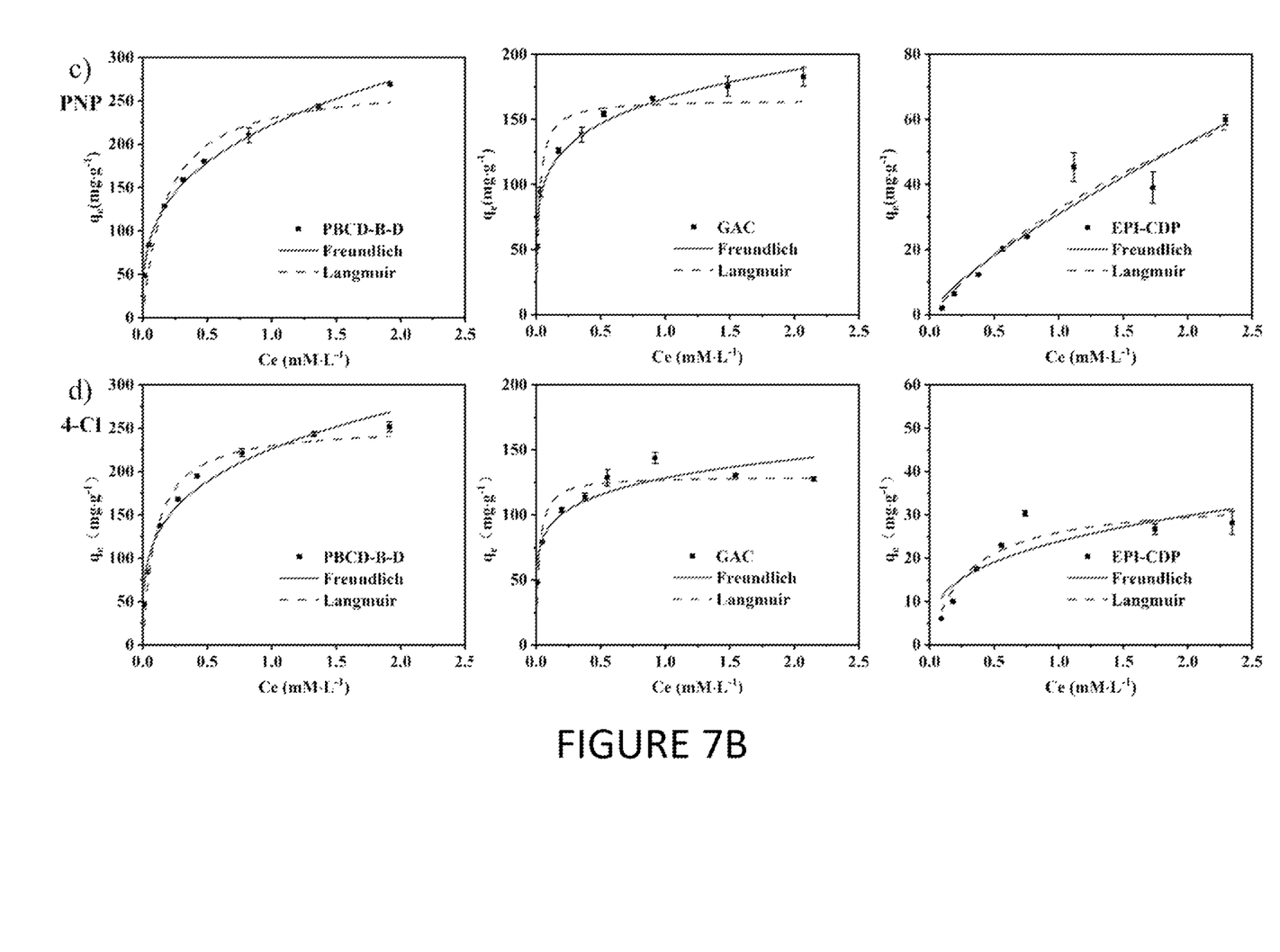

The results of adsorption experiments on different water-soluble pollutants are as follows. PBCD-B-D has very high adsorption efficiency for all the studied pollutants, the removal efficiency within 1 minute can be greater than 95%. In addition, the adsorption capacity of PBCD-B-D for all the studied pollutants is more than 2 times that of activated carbon, and more than 4 times that of EPI-CDP. Moreover, the adsorption capacity of PBCD-B-D is little affected by the water solubility of pollutants. The kinetics results are shown in FIG. 6, and the adsorption isotherm results are shown in FIGS. 7A-7B.

(1) 3-phenylphenol ($C_s$: 0.14 g $L^{-1}$)

When the initial concentration is 2.4 mmol $L^4$, the equilibrium adsorption capacity of PBCD-B-D on 3-phenylphenol is up to 3.38 mmol $g^{-1}$, which is more than two times that of GAC (1.52 mmol $g^1$), and more than four times that of EPI-CDP (0.77 mmol $g^1$). The removal efficiency of PBCD-B-D within 10 seconds is 93.23%, and the removal efficiency reaches greater than 99% within 1 minute, and the removal efficiency approaches 100% within 30 minutes (lower than the quantification limit of the instrument). In comparison, GAC does not reach equilibrium within 30 minutes, the removal efficiency is only 77.71%; while non-porous EPI-CDP does not reach equilibrium within 30 minutes either, and the removal efficiency is lower, only 70.42%.

(2) 2-naphthol ($C_s$: 0.76 g $L^{-1}$)

The adsorption capacity of PBCD-B-D on 2-naphthol at an initial concentration of 2.4 mmol 11 is 2.50 mmol $g^{-1}$, which is much higher than that of GAC (1.52 mmol $g^{-1}$) and EPI-CDP (0.77 mmol $g^{-1}$). The removal efficiency of PBCD-B-D within 10 seconds is 95.99%, the removal efficiency within 1 minute reaches greater than 99%, and the removal efficiency within 30 minutes approaches 100% (lower than the quantification limit of the instrument). In comparison, GAC and EPI-CDP do not reach equilibrium within 30 minutes, the removal efficiencies are only 85.55% and 49.22%, respectively.

(3) p-nitrophenol ($C_s$: 11.6 g $L^{-1}$)

The adsorption capacity of PBCD-B-D on p-nitrophenol at an initial concentration of 2.4 mmol $L^{-1}$ is 1.96 mmol $g^{-1}$, which is much higher than that of GAC (1.32 mmol $g^{-1}$) and EPI-CDP (0.43 mmol $g^{-1}$). The removal efficiency of PBCD-B-D within 10 seconds is 79.25%, the removal efficiency within 1 minute reaches greater than 95%, and the removal efficiency within 30 minutes approaches 100% (lower than the quantification limit of the instrument). In comparison, GAC and EPI-CDP do not reach equilibrium within 30 minutes, the removal efficiencies are only 87.74% and 47.34%, respectively.

(4) 4-chlorophenol ($C_s$: 24 g $L^{-1}$)

The adsorption capacity of PBCD-B-D on 4-chlorophenol at an initial concentration of 2.4 mmol $L^{-1}$ is 1.96 mmol $g^{-1}$, which is much higher than that of GAC (0.99 mmol $g^{-1}$) and EPI-CDP (0.22 mmol $g^{-1}$). The removal efficiency of PBCD-B-D within 10 seconds is 89.91%, the removal efficiency within 1 minute reaches greater than 95%, and the removal efficiency within 30 minutes approaches 100% (lower than the quantification limit of the instrument). In comparison, GAC and EPI-CDP do not reach equilibrium within 30 minutes, the removal efficiencies are only 74.49% and 29.01%, respectively. It can be seen that high specific surface area is a key factor for adsorption capacity. As a large amount of hydroxy groups are retained on the surface of cyclodextrin, they are more likely to form hydrogen bonds with hydrophilic pollutants, therefore PBCD-B-D still has good adsorption performances on hydrophilic pollutants. It is indicated from these results that PBCD-B-D is an effective amphiphilic adsorbent.

Embodiment 4

Regeneration experiment on the amphiphilic hyper-cross-linked porous cyclodextrin polymer PBCD-B-D prepared in Embodiment 1:

The experiment on the regeneration performance of the material is conducted specifically as below: 40 mg PBCD-B-D is added into 40 mL 3-phenylphenol solution at 0.1 mmol $L^1$ and shaken at 200 rpm for 10 minutes at 20° C. PBCD-B-D is separated by filtration and regenerated by ethanol desorption. The concentration of 3-phenylphenol in the filtrate is analyzed to calculate the removal efficiency. This process is repeated for five times to research the regeneration performance.

Figure 8:
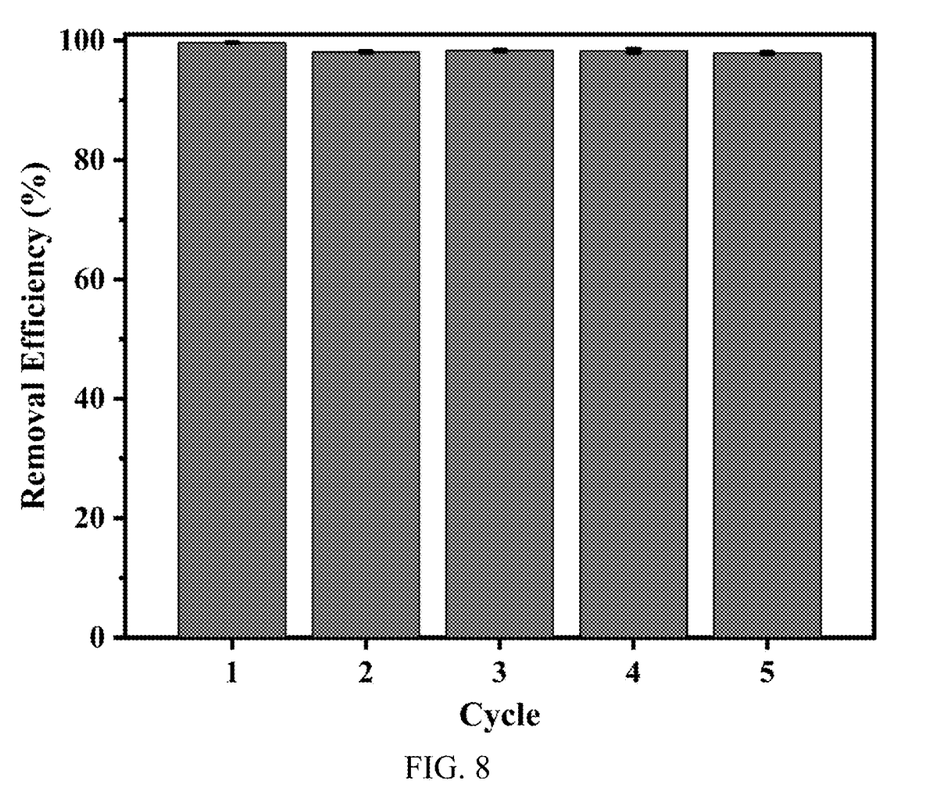
FIG. 8: The research on the regeneration performance of PBCD-B-D in Embodiment 1.

As shown in FIG. 8, PBCD-B-D can be adsorbed and desorbed rapidly by simple ethanol elution. The adsorption-desorption experiment is conducted on 3-phenylphenol for 5 times at room temperature, showing that the adsorption efficiency does not decrease significantly and remains at 97.89%. Therefore, in view of its excellent adsorption performance and good renewability, the porous cyclodextrin polymer is considered as a material with perfect adsorption and enrichment effects.

Figure 1:
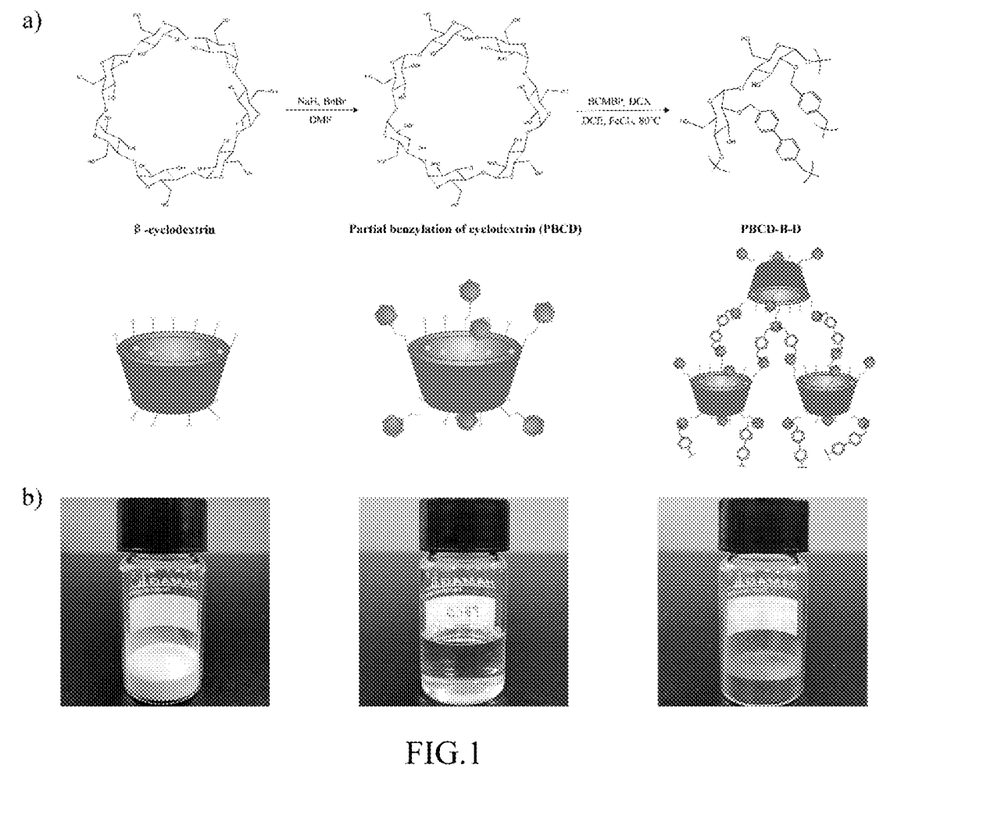
FIG. 1: The synthetic route of a cyclodextrin porous polymer with a high specific surface area by partial benzylation of β-cyclodextrin and then crosslinking with biphenyl benzylidene chloride and p-xylylene dichloride.

FIG. 1 shows the synthetic route of the hyper-cross-linked porous cyclodextrin polymer PBCD-B-D, in which β-cyclodextrin is partially benzylized first and then crosslinked with the alkylating agents, biphenyl benzylidene chloride and p-xylylene dichloride, to form a porous polymer.

Figure 2:
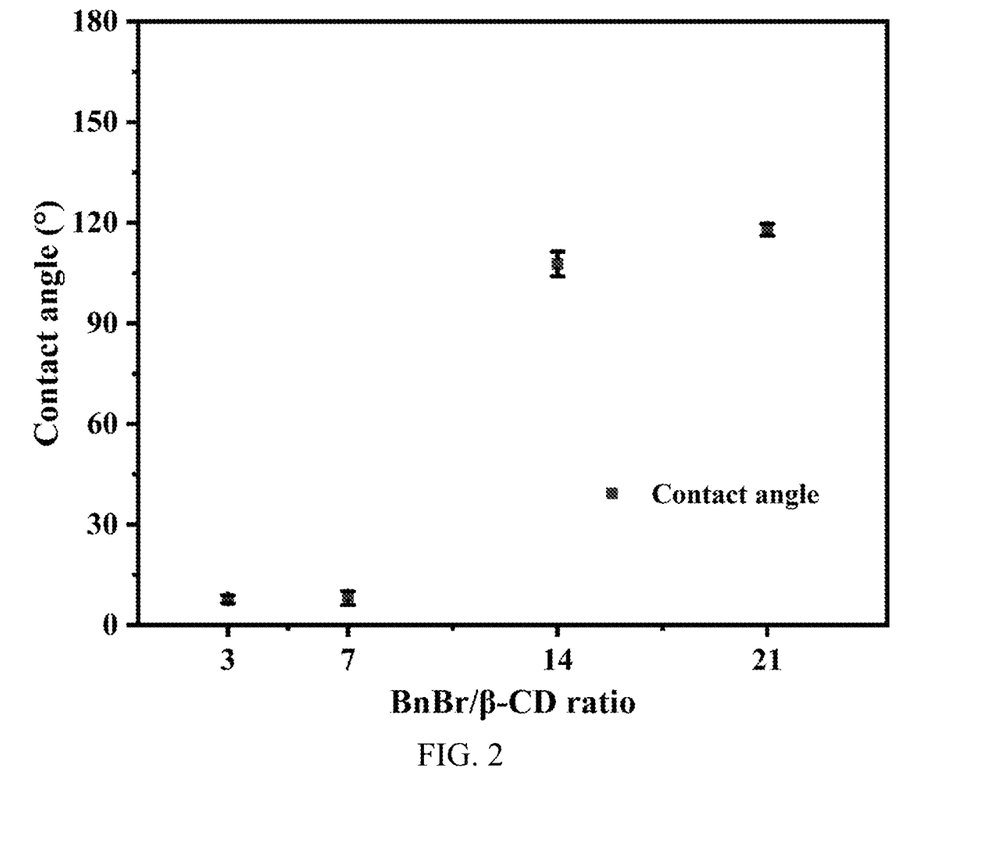
FIG. 2: The diagram showing the contact angles of PBCD-B-D in Embodiment 1, characterizing its hydrophilcity and hydrophobicity.

FIG. 2 shows the changing profile of the contact angle of the polymer after adjusting the proportion of benzylation. When the benzylation proportion of β-cyclodexirin decreases from 14:1 to 7:1, the material changes from superhydrophobic to hydrophilic on the surface due to the effects of hydroxy groups. Due to its superhydrophobicity and light-weight, the cyclodexffin material with high benzylation has poor wettability, thus affecting the diffusion process of liquid phase adsorption. On the contrary, PBCD-B-D can disperse quickly in water. The good wettability, combined with its porous structure, provides favorable conditions for rapid removal of organic pollutants. We can utilize this material under different conditions by adjusting the degree of benzylation, for example, in gas adsorption where moisture interference needs to be removed.

Figure 3:
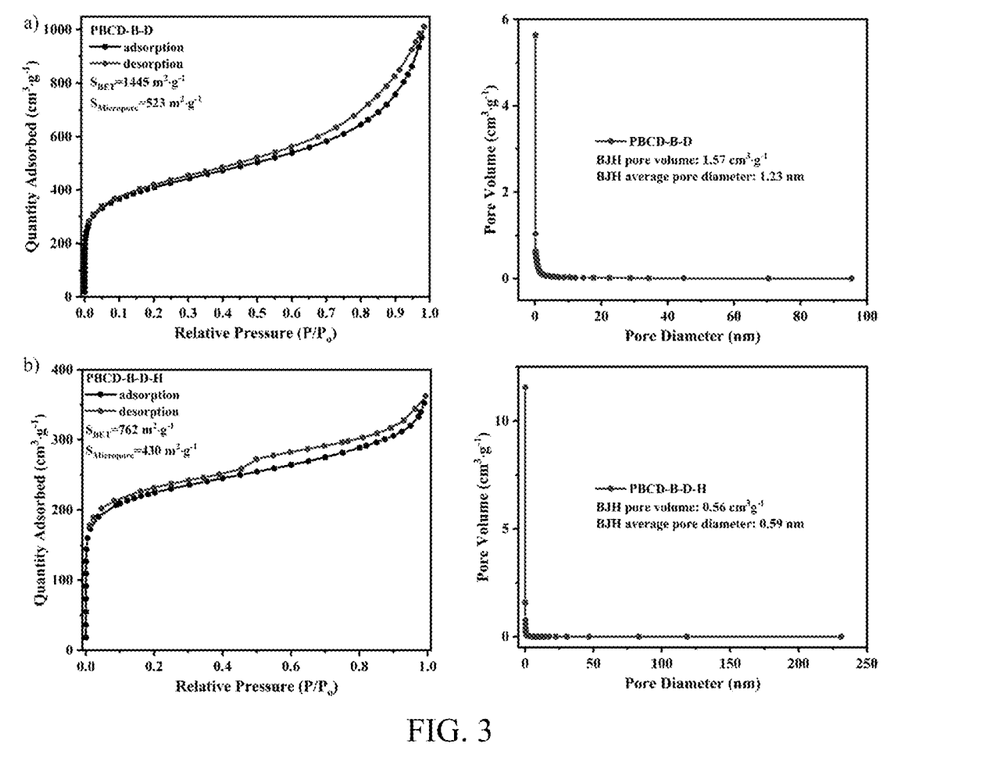
FIG. 3: The diagrams showing the nitrogen adsorption isotherm, specific surface area, and pore size distribution of PBCD-B-D in Embodiment 1 and Embodiment 2.

FIG. 3 covers the diagrams showing the nitrogen adsorption isotherm and pore size distribution of PBCD-B-D in Embodiment 1 and Embodiment 2. It can be seen that the materials all exhibit ultrahigh specific surface areas and large micro-pore volumes. Moreover, the distribution of pore structures is mainly micro-pores.

Figure 4:
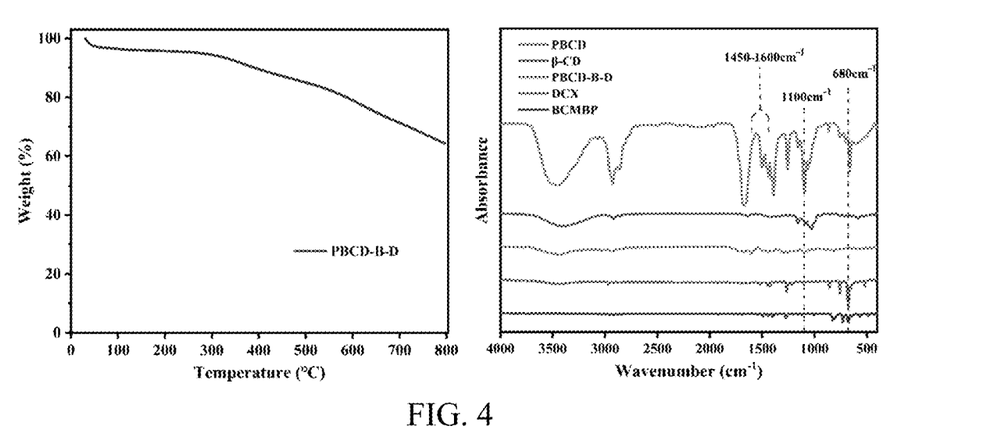
FIG. 4: The thermogravimetric analysis diagram and infrared spectrogram of PBCD-B-D in Embodiment 1.

FIG. 4 shows the thermogravimetric analysis diagram and the infrared spectrogram of PBCD-B-D in Embodiment 1. It can be seen from the thermogravimetric curve that the mass loss of PBCD-B-D at 275° C. is only 5%, Compared with other cyclodextrin materials, the cyclodextrin material of the invention has higher degree of crosslinking and higher thermal stability. The good thermal stability shows the advantage of the material in practical applications.

In the infrared spectrum, it shows PBCD, β-cyclodextrin, PBCD-B-D, DCX, BCMBP from top to bottom. Compared with the infrared spectrum of β-cyclodextrin, PBCD-B-D still has a distinct hydroxy peak at the wavelength of 3400 $cm^{-1}$, indicating that the hydroxy groups of cyclodextrin are partially retained. The signals in the wavelength range from 1450 $cm^{-1}$ to 1600 $cm^{-1}$ indicate the formation of aromatic rings. The peak values from 680 $cm^{-1}$ to 880 $cm^{-1}$ reflects the adsorption of the bending and vibration of carbon-hydrogen by the aromatic rings. The peak value at 1100 $cm^{-1}$ indicates the presence of aliphatic ether. In addition, compared with the reactants, biphenyl benzylidene chloride and p-xylylene dichloride, the chloromethyl peak of PBCD-B-D at 680 $cm^{-1}$ disappears, indicating the crosslinking of the polymer.

Figure 5:
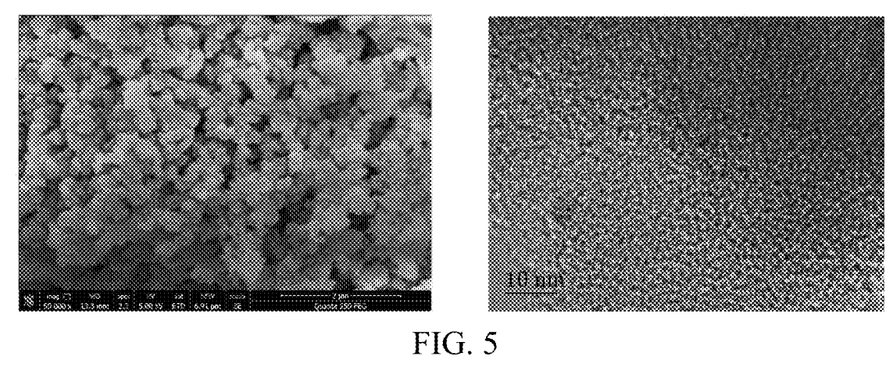
FIG. 5: The scanning electron microscopic image and transmission electron microscopic image of PBCD-B-D in Embodiment 1.

FIG. 5 shows the scanning electron microscopic image and transmission electron microscopic image of PBCD-B-D in Embodiment 1. The surface morphology and uniform particle size of PBCD-B-D can be seen from the SEM image. This material has obvious macroporous structures, which is consistent with the pore size distribution obtained from the nitrogen adsorption isotherm. It can be seen from the TEM image that, the material has a large amount of microporous structures, confirming that this material has a large pore volume and an ultrahigh specific surface area.

What is claimed is:

1. A preparation method of an amphiphilic cyclodextrin porous polymer, wherein:
   cyclodextrin is grafted with an aromatic compound, and then crosslinked with an alkylating agent with Lewis acid as the catalyst, wherein
   the BET specific surface area of the cyclodextrin porous polymer, determined by the nitrogen isotherm method, is greater than 1200 $m^2g^{-1}$.

2. The preparation method according to claim 1, wherein the aromatic compound is a halogenated aromatic compound.

3. The preparation method according to claim 1, wherein the aromatic compound is a benzylation reagent.

4. The preparation method according to claim 3, wherein the molar ratio of the benzylation reagent to cyclodextrin is in a range of 3:1 to 7:1.

5. The preparation method according to claim 1, wherein the alkylating agent is any one or a combination of two or more benzene ring-containing alkylating agents.

6. The preparation method according to claim 5, wherein the benzene ring-containing alkylating agents are selected from the group consisting of p-xylylene dichloride, biphenyl benzylidene chloride, p-xylylene dibromide, and biphenyl benzylidene bromide.

7. The preparation method according to claim 6, wherein the molar ratio of the alkylating agent to the benzylized cyclodextrin is 5:1 to 8:1.

8. The preparation method according to claim 1, wherein the Lewis acid is metal chloride or sulfuric acid.

9. The preparation method according to claim 2, wherein the aromatic compound is a benzylation reagent.

10. The preparation method according to claim 9, wherein the molar ratio of the benzylation reagent to cyclodextrin is in a range of 3:1 to 7:1.

11. The preparation method according to any one of claims 1 to 8 or 9 to 10 wherein, the cyclodextrin is grafted with a halogenated aromatic compound, the method further comprising the steps of:
   a. cyclodextrin is dissolved and cooled in an ice-water bath, sodium hydride is added and stirred evenly, into which is added dropwise the reagent to be grafted slowly, heated to room temperature and stirred overnight;
   b. after reaction overnight, a light yellow solution is obtained, into which is added methanol to quench the reaction;
   c. distilled water is added and mixed, the mixture is extracted with dichloromethane continuously for three times, dried and filtered, and rotary evaporated at the boiling point of dichloromethane to obtain a light yellow solution;
   d. the benzylized cyclodextrin and the alkylating agent are dissolved, into which is slowly added Lewis acid as the catalyst for reaction under the protection of nitrogen; and
   e. a brown precipitate is obtained, which is washed with methanol and water until the filtrate becomes neutral and colorless, extracted through Soxhlet extraction with methanol, then dried in a vacuum oven, and ground and sieved to obtain brown powder.

* * * * *